United States Patent [19]

Kohar et al.

[11] Patent Number: 5,579,873
[45] Date of Patent: Dec. 3, 1996

[54] BRAKE ACTUATOR VIBRATION ISOLATION SYSTEM

[75] Inventors: Richard Kohar, Kingston, Canada; Brian M. McLaughlin, Watertown, N.Y.

[73] Assignee: New York Air Brake Corporation, Watertown, N.Y.

[21] Appl. No.: 377,986

[22] Filed: Jan. 25, 1995

[51] Int. Cl.⁶ .................................................. F16D 65/38
[52] U.S. Cl. ...................................... 188/73.35; 188/73.31
[58] Field of Search .............................. 267/141, 141.2, 267/141.3, 141.7, 161, 258, 140.2; 188/73.35, 56, 59, 72.6, 206 R, 3 R, 3 H; 277/88, 89, 95, 97, DIG. 9

[56] References Cited

U.S. PATENT DOCUMENTS

| | | | |
|---|---|---|---|
| 2,374,859 | 10/1943 | Gaenssle | 188/153 |
| 2,827,303 | 3/1958 | Herbenar | 280/96.2 |
| 3,152,846 | 10/1964 | Dumpis | 403/158 |
| 3,193,335 | 7/1965 | Wing | 308/22 |
| 3,989,126 | 11/1976 | Katzer | 188/206 R |
| 4,053,034 | 10/1977 | Katzer | 188/206 R |
| 4,446,948 | 5/1984 | Melinat | 188/73.35 |
| 4,480,722 | 11/1984 | Wirth | 188/59 |
| 4,766,980 | 8/1988 | Engle | 188/52 |
| 5,058,712 | 10/1991 | Noah | 188/59 |
| 5,112,178 | 5/1992 | Overhues | 267/161 |

FOREIGN PATENT DOCUMENTS 2179105  2/1987  United Kingdom .

*Primary Examiner*—Robert J. Oberleitner
*Assistant Examiner*—C. T. Bartz
*Attorney, Agent, or Firm*—Barnes & Thornburg

[57] ABSTRACT

A brake actuator vibration isolation system wherein a spring is provided between and separates an actuator and a lever of a caliper for retarding vibration of the actuator relative to the lever when the brake assembly is not actuated. The spring is preloaded by the actuator pin and one or more washers. The spring characteristics are selected to retard the anticipated vibration of the actuator relative to the lever when the brake caliper assembly is not actuated. Selecting includes selecting the preloading of the spring by the actuator pin, selecting the thickness of a washer about the actuator pin to vary the preloading of the spring, and selecting the material of the spring, its cross-section as well as other characteristics.

21 Claims, 3 Drawing Sheets

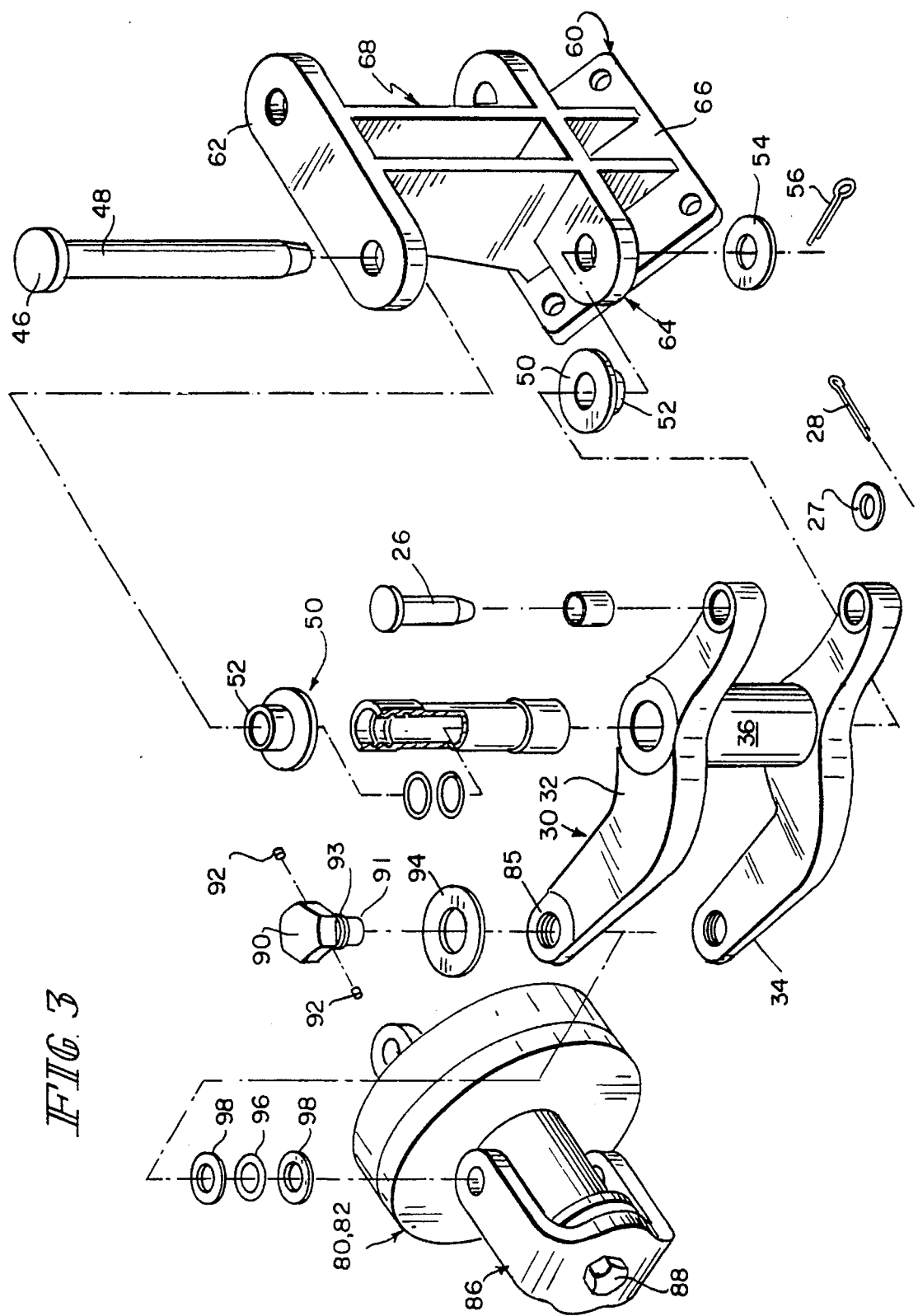

BRAKE ACTUATOR VIBRATION ISOLATION SYSTEM

BACKGROUND AND SUMMARY OF THE INVENTION

The present invention relates generally to brake actuators and more specifically to a vibration isolation system for brake actuators used with caliper brakes.

Since the 1960's, rail car operation and engineering have been experiencing the need for faster, safer and more light weight trains. The industry has been gaining experience in metallurgy and failure mechanisms as well as the ability to generate better definition of vibration operating environments affecting the brake systems.

The need for faster, safer trains has dictated the use of more complicated brake actuator and caliper systems. These systems usually incorporate intricate slack adjustor systems. With so many more pieces, the probability of failure due to component systems responding to a wider spectrum of damaging vibrations has become a problem.

With the advancements in vibration technology has come a better understanding of the brake component failure mechanisms. The damaging shock and vibrations can be accurately defined. To isolate these from the brake caliper and actuator, a tuneable, adjustable, isolation system is needed which will reduce the shock loading also. The present systems are not easily adjusted without an expensive and time consuming design or production modification. Many brake systems do not have any shock or vibration isolation for the calipers or actuators.

Many suspension systems address shock but do not reduce one of the major causes of wear, fretting. Fretting is where a component is able to move or has play in it due to assembly tolerances. While the components are in the unloaded condition, namely brakes not applied, they are free to move around. In many cases, they rattle around or are responding to the ever present broad range of vibration generated by a rail car's steel wheel and stiff primary suspension systems. These never ending, continuous micromotions are the main ingredient in fretting. Because the mating steel on steel surfaces are not heavily loaded when the brakes are not applied, moisture and oxygen can continually attack and form oxides on the mating surfaces. These continually forming oxides are then quickly removed by the fretting motions, to begin the cycle again.

Many brake systems with a shock absorbing mount between the caliper and actuator assembly require additional brackets and linkages to transmit the braking loads to the truck frame. These systems with their extra linkages and brackets are less compact and more complicated.

Many brake vibration isolation systems are not dedicated to the actuator alone. They may suspend the entire mechanism of calipers, levers, pads, pins and actuators. While the brake systems are not applied, the entire sub-system is free to vibrate within itself, causing offensive noises and possibly damaging resonant vibrations.

Thus, the object of the present invention is to provide a rattle free brake actuator mounting system.

Another object of the present invention is to provide an actuator vibration isolation system with reduced fretting corrosion of the actuator, caliper and pin system.

An even further object of the present invention is to provide an actuator system capable of fine tuning in the field.

A still further object of the present invention is to provide a brake actuator vibration isolation system which can be retrofitted to existing brake systems.

These and other objects are achieved by brake caliper and actuator assembly wherein a spring is provided between and separates an actuator and a lever of the caliper for retarding vibration of the actuator relative to the lever when the brake assembly is not actuated. An actuator pin, which connects the lever of the caliper to the actuator, includes a first threaded portion received in the caliper and separated by shoulder from a second non-threaded portion which is received in the actuator. A recess may be provided at the shoulder for receiving the spring. A locking plate is provided for locking the actuator pin to the lever.

The spring is a compressible ring about the actuator pin and between the actuator and the lever. The spring is preloaded by the actuator pin and a washer may be provided between the actuator and the spring to further adjust the preloading of the spring as well as to reduce the wear on the spring. Preferably, the spring is a ring of rigid non-metal material. A spring may also be a metal coil spring or a bevelled spring washer.

A method of designing a brake caliper and actuator assembly includes determining the anticipated vibration between the actuator and the lever when the brake caliper assembly is not actuated. The spring characteristics between and separating the actuator and the lever is selected to retard the anticipated vibration of the actuator relative to the lever when the brake caliper assembly is not actuated. Selecting includes selecting the preloading of the spring by the actuator pin. Preloading may be determined by selecting the thickness of a washer about the actuator pin and between the actuator pin and the actuator to vary the preloading of the spring. The selecting of the characteristics may also involve selecting material of the spring, its cross-section as well as other characteristics. The method also includes providing an actuator pin having a first threaded portion separated by shoulder from a second non-threaded portion and including a recess at the shoulder for receiving the spring.

Other objects, advantages and novel features of the present invention will become apparent from the following detailed description of the invention when considered in conjunction with the accompanying drawings.

BRIEF DESCRIPTION OF THE DRAWINGS

FIG. 3 is an exploded view of the brake actuator vibration isolation system according to the principles of the present invention.

DETAILED DESCRIPTION OF THE PREFERRED EMBODIMENT

Figure 2:
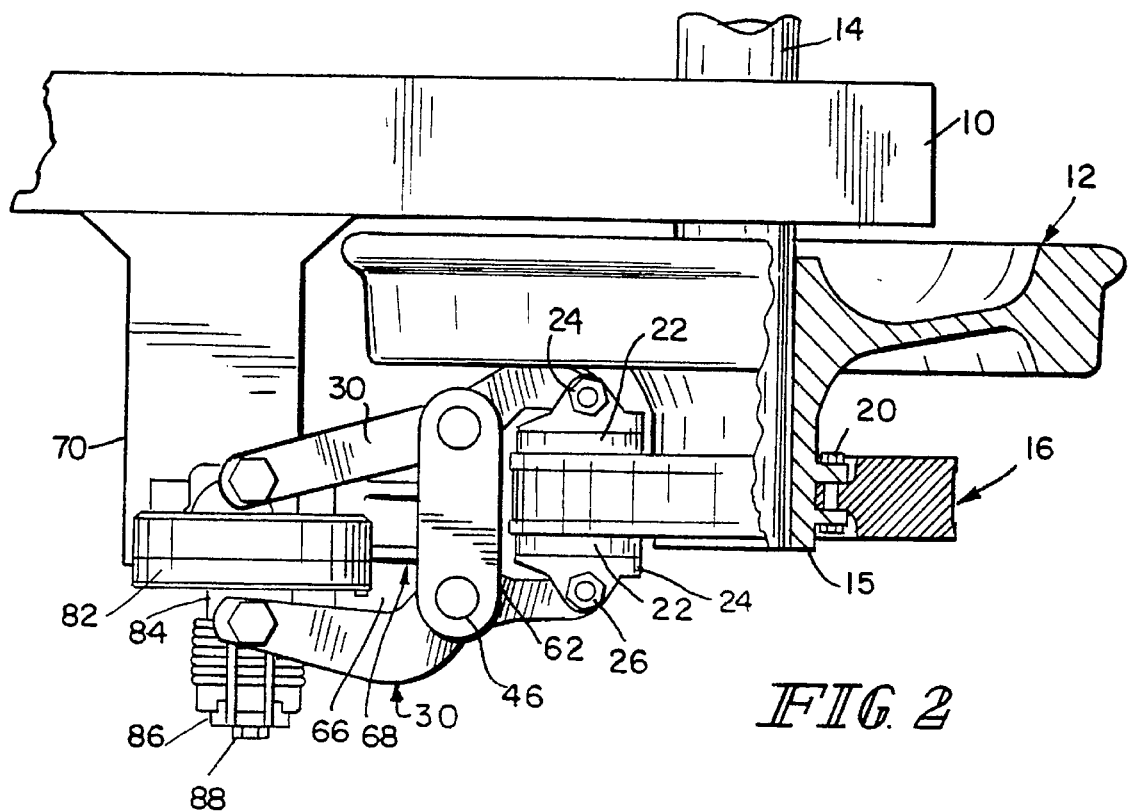
FIG. 2 is a plan view of the disk brake system of FIG. 1.
Figure 1:
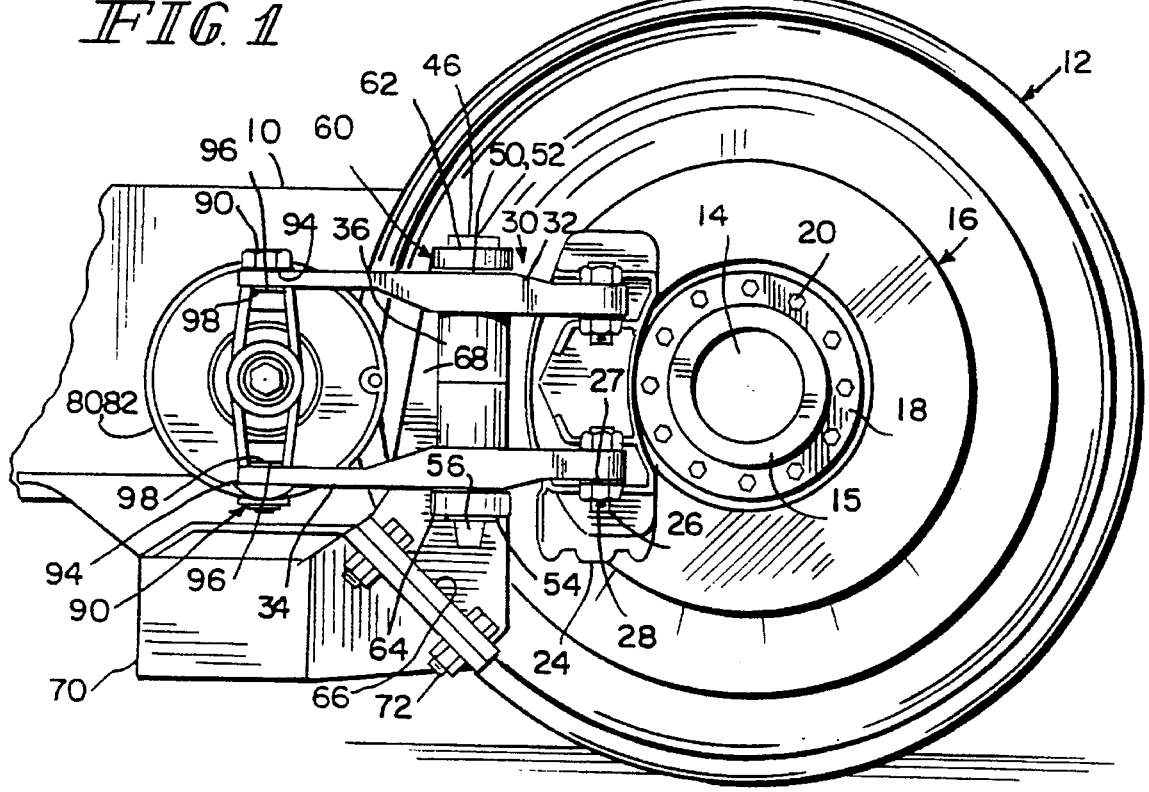
FIG. 1 is a side view of a disk brake system incorporating the principles of the present invention.

A disk brake assembly is illustrated in FIGS. 1 and 2 for a wheel 12 mounted to a truck or bogie frame 10 by an axle 14. Wheel hub 15 is also mounted to the axle 14. Friction disk 16 is mounted between a flange on the wheel hub 15 and tension ring 18 by fasteners 20. Brake lining or pads 22 are positioned on each side of the friction disk 16 and are mounted to a respective pad holder assembly 24. Pad pin 26 mounts the pad holder assembly 24 to upper lever arm 32 and lower lever arm 34 of the pair of caliper levers 30. A washer 27 separates a cotter pin 28 received in the end of the pad pin 26 from the lever arms 32 and 34. The upper lever arm 32 and the lower arm 34 are connected by a center lever shaft 36.

The lever assembly 30 is mounted to a bridge 60 between upper bridge plate 62 and lower bridge plate 64 by bridge pin 46. The lever arms 32, 34 are separated from the bridge plates 62, 64 by washers 50. The shaft 48 of bridge pin 46 is separated from the upper and lower bridge plates 62 and 64 by bridge bushings 52. A cotter pin 56 is received in the end of pin shaft 48 and is separated from the bottom of the lower bridge plate 64 by washer 54. Preferably, the upper washer 50 and the bridge bushing 52 are made of the same material and are unitary.

Vertical bridge plate 68 interconnects the upper bridge plate 62, lower bridge plate 64 and bridge mounting plate 66. The bridge 60 is mounted to bracket 70 by fasteners 72 through openings in bridge mounting plate 66. The bracket 70 is connected to the truck frame 10 by welding, for example.

An actuator 80 is connected between the pair of caliper levers 30 and forces them apart in opposite directions around the pivoting about the axis of the bridge pin 46 to apply the brakes.

The actuator includes a body 82 and a rod 84 extending therefrom. A yoke 86 is provided on the end of the rod 84 and held thereto by fastener 88. The brakes are shown in their unapplied or not activated position in FIG. 2. The body 82 is connected to one of the levers 30 and the yoke 86 is connected to the other lever 30 by an actuator or pin bolt 90. The actuator bolt 90 is threadably received in the levers 30 with the pin extending into the body 82 or the end of yoke 86. A lock plate 94 locks the bolt after it has been torqued down. The lock plate 94 is bent, as is well known with one side bent to engage the lever arm 32, 34 and the other side is bent up to engage the bolt 90.

Figure 4:
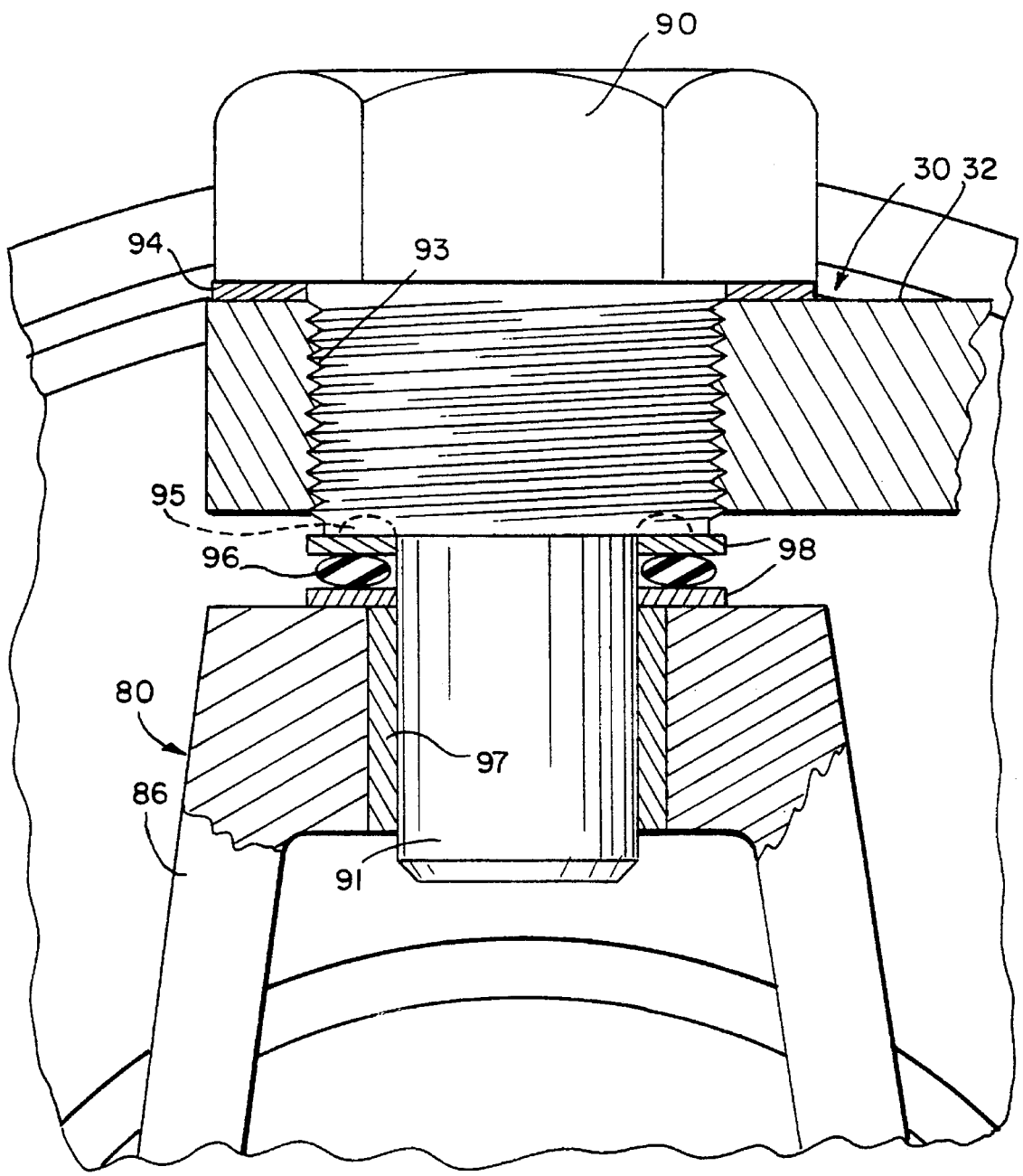
FIG. 4 is an enlarged, partial cutaway of the brake actuator vibration isolation system of the present invention.

Between the body 82 or the lever arms 32, 34 and the yoke 86 is an actuator vibration isolation system. Referring to FIG. 3 and 4, the system includes a spring 96 and one or more washers or spacers 98 where needed. The spacers 98 and actuator bolt 90 preload the spring 96. Because vibration isolation depends both on damping and spring rate, a buna-n "O" ring is preferred. It has been chosen for its easily varied spring and damping characteristics. The standard "O" ring design is readily available in many materials, diameters, and cross-section designs. Any one of the above can be used to quickly vary the damping or spring rate thereby modifying the overall system isolation characteristics.

The spacers 98 operate as a shim to perform two functions. First, they minimize the shearing of the spring elements 96, during the relative rotational motion between the actuators elements and the caliper lever arms 32, 34. Secondly, they allow the preload of the spring elements 96 to be adjusted. In the case of non-linear spring element, such as an "O" ring, adjusting the preload also varies the initial spring rate of the system. Adjusting the spring rate, adjusts the frequency response (or conversely the transmissibility) of the suspension system. This final system adjustability provides fine tuning capability, to minimize any unwanted vibration transmission discovered in the initial testing phase of a new design or environment.

As illustrated in FIG. 3 and 4, the actuator screw 90 includes a non-threaded pin portion 91 received in the corresponding body portion 82 and yoke 86 and threaded pin section 93 received in the arms 32, 34 of the lever assembly 30. A recess 95, as shown in phantom, may be provided at the shoulder between the non-threaded pin section 91 and the threaded section 93 to receive the spring 96. Polymer buttons 92, shown in FIG. 3, received in diametrically opposed openings in the non-threaded portion 91 of the actuator bolt provides additional thread locking with the lever assembly 30.

The main function of the bolt 90 is to support the actuator 80 and to transmit actuator brake forces to the caliper arms 32 and 34. The washer 98 functions as a vibration isolating spring element. Thus, the method of designing brake caliper and actuator assemblies would include determining the anticipated vibration between the actuator and the lever when the brake assembly is not actuated. The spring characteristics of the spring between the actuator and the lever is selected to retard anticipated vibration there between. The spring characteristics are selected by selecting the preloading of the spring by the actuator pin in combination with washers or shims. The material and the cross-sectional area of the spring may also be selected to vary the spring characteristics.

The present brake actuator vibration isolation system targets vibration isolation needs of the individual brake actuator.

This actuator suspension allows more compact packaging of the brake system. It minimizes the need for a suspension between the calipers and truck mounting brackets. At present, many brake systems, which have suspensions, have a rubber bushing system between the calipers and the truck mounting brackets. Because this type of suspension is so flexible, with three degrees of freedom (rotational, and translational in the vertical and longitudinal directions), the calipers are not able to directly transmit the braking forces from the pads or shoes to the truck frame. An additional truck mounting bracket and linkage system is added to transmit these forces. The present system will obsolete these linkages, making the brake system much more compact, and lightweight.

Much is known in theory, about vibrations and mass/spring/damper systems. However, even the best mathematical modeling will still yield an approximate design which needs field verification and long term evaluation. The present suspension system is advanced and unique. It can immediately be field adjusted, where until now, all others require expensive design and manufacturing changes, taking many weeks to accomplish. This system's isolation characteristics are easily adjusted or tuned to minimize the transmission of harmful vibrations from the truck frame and brake calipers. Adjustments are made by substituting different commercially available isolating spring elements. Preferably, a buna-n "O" ring is being used. For example, it is readily available in three different hardnesses in the same size and in all standard polymers, besides buna-n. The size and configuration of many different rings are available. For example, standard "K" rings and square rings are available. The polymer suspension rings can also be replaced by bevel spring washers or even standard steel coil springs. In other words, the design is very flexible allowing easy combinations or materials, shapes, and preloads to be tried in the field to fine tune the suspension for each brake system application.

Finally, the present system could be retrofitted to many existing brake systems, greatly improving the brake actuator's reliability.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake caliper and actuator assembly having an actuator pivotally connected to at least one lever of a caliper by an actuator pin and further comprising:

said actuator pin including a first threaded portion received in said lever and separated by a shoulder from a second non-threaded portion received in said actuator;

a spring at said shoulder between said actuator pin and said lever for retarding vibration of said actuator relative to said lever when said brake caliper assembly is not activated.

2. A brake caliper and actuator assembly according to claim 1, wherein said spring is a beveled spring washer about said actuator pin.

3. A brake caliper and actuator assembly according to claim 1, including a recess at said shoulder receiving said spring.

4. A brake caliper and actuator assembly according to claim 3, wherein said spring is a compressible ring about said actuator pin and between said actuator and said lever.

5. A brake caliper and actuator assembly according to claim 4, wherein said ring is pre-loaded by said actuator pin.

6. A brake caliper and actuator assembly according to claim 5, including a washer separating said ring from said actuator and said lever.

7. A brake caliper and actuator assembly according to claim 6, wherein said washer is a non-metal.

8. A brake caliper and actuator assembly according to claim 6, wherein the thickness of said washer is selected to vary the pre-loading of the ring.

9. A brake caliper and actuator assembly according to claim 1, wherein said spring is a compressible ring about said actuator pin and between said actuator and said lever.

10. A brake caliper and actuator assembly according to claim 9, wherein said ring is pre-loaded by said actuator pin.

11. A brake caliper and actuator assembly according to claim 10, including a washer separating said ring from said actuator and said lever.

12. A brake caliper and actuator assembly according to claim 11, wherein said washer is a non-metal.

13. A brake caliper and actuator assembly according to claim 12, wherein the thickness of said washer is selected to vary the pre-loading of the ring.

14. A brake caliper and actuator assembly according to claim 1, wherein said spring is pre-loaded by said actuator pin; and including a washer about said actuator pin between said actuator pin and said actuator and having a thickness selected to vary the pre-loading of the spring.

15. A brake caliper and actuator assembly according to claim 14, wherein said washer is a non-metal.

16. A brake caliper and actuator assembly according to claim 1, wherein said spring is a metal coil spring about said actuator pin.

17. A method of designing a brake caliper and actuator assembly having at least one lever pivotally connected to an actuator by an actuator pin; a spring between and separating said actuator and said lever for retarding vibration of said actuator relative to said lever when said brake caliper assembly is not activated; comprising the steps of:

providing an actuator pin including a first threaded portion received in said lever and separated by a shoulder from a second non-threaded portion received in said actuator:

determining the anticipated vibration between said actuator and said lever when said brake caliper assembly is not activated;

selecting the spring characteristics of said spring to retard said anticipated vibration of said actuator relative to said lever when said brake caliper assembly is not activated; and positioning said spring at said shoulder between said actuator pin and said lever.

18. A method according to claim 17, wherein said selecting includes selecting the cross-section of said spring.

19. A method according to claim 17, wherein said spring is about said actuator pin and between said actuator and said lever; and said selecting includes selecting preloading of said spring by said actuator pin.

20. A method according to claim 19, wherein said selecting said pre-loading includes selecting the thickness of a washer about said actuator pin and between said actuator pin and said actuator to vary the pre-loading of the spring.

21. A method according to claim 17, wherein said selecting includes selecting the material of said spring.

* * * * *